United States Patent
Huang et al.

(10) Patent No.: US 7,307,766 B2
(45) Date of Patent: Dec. 11, 2007

(54) BLACK AND WHITE IMAGE DETECTION

(75) Inventors: Hanqiang Huang, Irvine, CA (US); Yung-Kai Lai, Irvine, CA (US)

(73) Assignee: Good News Enterprises Limited, Taichung Hsien (TW)

( * ) Notice: Subject to any disclaimer, the term of this patent is extended or adjusted under 35 U.S.C. 154(b) by 1001 days.

(21) Appl. No.: 10/406,919

(22) Filed: Apr. 4, 2003

(65) Prior Publication Data

US 2004/0196515 A1    Oct. 7, 2004

(51) Int. Cl.
*H04N 1/46* (2006.01)
(52) U.S. Cl. .................... 358/515; 358/1.9; 358/2.1; 358/538; 358/540; 358/461; 358/462; 358/463; 382/162; 382/163; 382/168
(58) Field of Classification Search .......... 358/2.1, 358/538, 540, 1.9, 461, 463, 515, 462; 382/162, 382/168, 163
See application file for complete search history.

(56) References Cited

U.S. PATENT DOCUMENTS 5,973,804 A * 10/1999 Yamada ............... 358/538
6,097,845 A * 8/2000 Ng et al. ............... 382/239
7,085,413 B2 * 8/2006 Huang et al. ............ 382/163
2003/0053115 A1 * 3/2003 Shoda et al. ............ 358/1.15

FOREIGN PATENT DOCUMENTS

JP    10148992 A  *  6/1998

* cited by examiner

*Primary Examiner*—Kimberly Williams
*Assistant Examiner*—Michael Burleson
(74) *Attorney, Agent, or Firm*—Thomas, Kayden, Horstemeyer & Risley

(57) ABSTRACT

A method and apparatus for classifying an input image as black and white or color is described. The method calculates a first ratio of a color pixel portion to a total pixel portion in the input image. Next, the method calculates a second ratio of the color pixel portion to a combined pixel portion in the input image, where the combined pixel portion comprises the color pixel portion and a dark black and white pixel portion. Finally, the method returns an indication the input image is black and white if the first ratio is less than a first threshold and the second ratio is less than a second threshold.

14 Claims, 2 Drawing Sheets

BLACK AND WHITE IMAGE DETECTION

BACKGROUND OF THE INVENTION

1. Field of the Invention

The invention relates in general to image processing. More particularly, this invention relates to a method and apparatus for detecting and separating black and white images from color images.

2. Description of the Related Art

In the processing of images, the ability to detect and separate black-and-white (or called grayscale) images from color images is often desired. Black and white images have different characteristics than color images, and different image processing techniques can be applied to each. Separating black and white images from color images not only facilitates the use of such different techniques, but also improves the processing speed because only one-channel computation is necessary for black and white image processing. In addition, the separation of black and white images from color images saves printing costs because black and white toner can be used for images that are only black and white.

In U.S. Pat. No. 5,729,624, Tanioka discloses an image processing apparatus and method for processing color image signals. The apparatus comprises a first judgment unit for judging whether a pixel of interest belongs to a black line image portion, and outputting a first judgment signal indicating a judgment result, a second judgment unit for judging whether pixels in the vicinity of the pixel of interest belong to a black line image portion, and outputting a second judgment signal indicating a judgment result, and a control unit for controlling recording of the pixel of interest based on the first and second judgment signals outputted from the first and second judgment units. With the apparatus, black lines in a color image are satisfactorily reproduced. The present invention, on the other hand, separates black and white images from color images according to the percentage of color pixels in the whole image, and then evaluates the ratio of color pixels to a combined portion of color pixels and dark pixels. While Tanioka focuses on satisfactorily reproducing black lines in a color image, the present invention allows for the detection and separation of black and white images from color images.

SUMMARY OF THE INVENTION

Accordingly, one object of the present invention is to provide an image processing device and method that detects black-and-white images.

A second object of the invention is to provide an image processing device and method that detects color images.

A third object of the invention is to provide an image processing device and method that separate black-and-white images from color images.

A fourth object of the invention is to provide an image processing device and method that decrease printing and copying costs.

To achieve these and other advantages and in accordance with the purpose of the invention, as embodied and broadly described herein, the invention provides a method and apparatus for classifying an input image as black and white or color. The method calculates a first ratio of a color pixel portion to a total pixel portion in the input image. Next, the method calculates a second ratio of the color pixel portion to a combined pixel portion in the input image, where the combined pixel portion comprises the color pixel portion and a dark pixel portion. Finally, the method returns an indication the input image is black and white if the first ratio is less than a first threshold and the second ratio is less than a second threshold.

Both the foregoing general description and the following detailed description are exemplary and explanatory only and are not restrictive of the invention, as claimed.

DESCRIPTION OF THE PREFERRED EMBODIMENTS

Before proceeding with a description of the method and apparatus of the present invention, a summary of the RGB color space, which may be helpful in understanding the disclosed embodiment, is provided.

RGB color is composed of specified values of red, green, and blue components. A combination of these three colors create all of the other colors in a digital representation of an image.

In a 24-bit color system, the red, green, and blue components are each allotted 8 bits. This may be referred to as an "RGB color triplet." Each color component within the RGB color triplet has a value in the range of 0 to 255. (R,G,B)=(0,0,0) represents black, an absence of color. (R,G,B)=(255,255,255), on the other hand, represents white.

Figure 1:
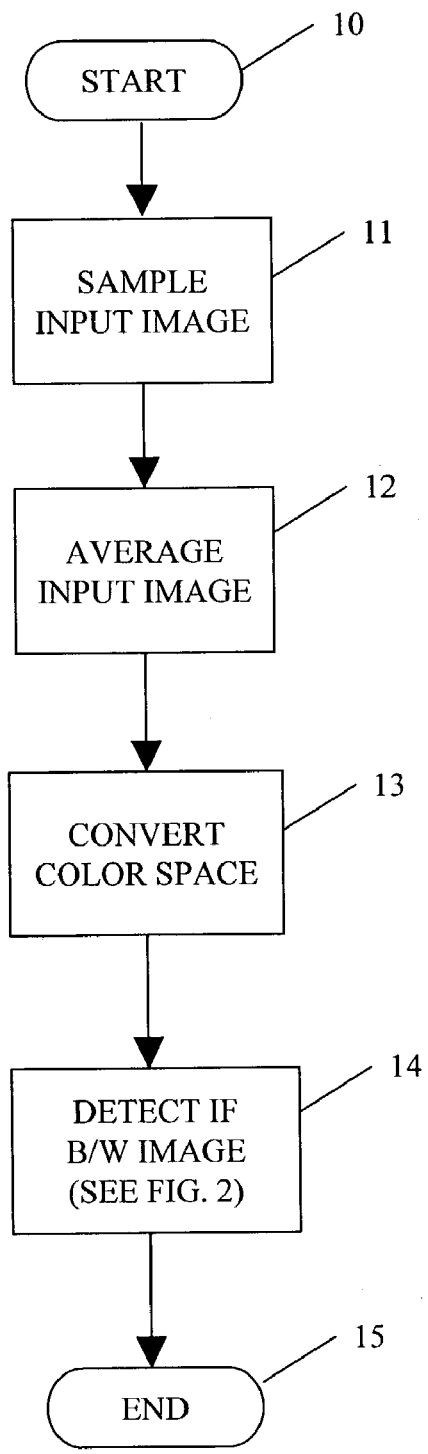
FIG. 1 is an overall block diagram illustrating the process of the present invention.

Referring now to FIG. 1, a block diagram of the overall process of the present invention is shown. The process begins with start bubble 10 followed by a process step (block 11) of sampling the input image. In this step, a sampler samples across the input image with either uniform or nonuniform spacing, horizontally and/or vertically. As an alternative, the process can set the sampling period to be one pixel so all pixels in the image are used. At each sampling location, the RGB values of the sampled pixel and its neighboring pixels are obtained. The neighborhood of the sampled pixels can be defined as pixels within reasonable geometrical distance from the sampled pixel.

After sampling the image, process step 12 averages the input image. In averaging the input image, an averager takes a sample pixel and averages it with its neighboring pixels. The averaging operation is meant to remove possible color deviation in the image acquisition process. For example, if the image is obtained through color scanning or captured by a digital camera, color fringing may occur along object boundaries.

With reference to FIG. 1, the process continues with a process step (block 13) of converting the color space. In this step, the three averaged RGB values from block 12 are transformed by a color space converter that separates chrominance and luminance components. An example of such space is the YUV color space, and the conversion from RGB color space to it can be formulated as:

$$Y = 0.301*R + 0.586*G + 0.113*B$$

$$U = -0.168*R - 0.332*G + 0.500*B$$

$$V = 0.500*R - 0.418*G - 0.082*B$$

where the U and V components in the YUV color space represent the chromaticity of the averaged samples, and Y represents the luminance of the samples. The process uses the YUV color space as an example, but other color spaces separating chrominance and luminance components also can be used.

After converting the color space, the process continues with a process step (block 14) of detecting whether the image is a black and white image. The black and white image detection process is further described in FIG. 2. The process then exits (end bubble 15).

Figure 2:
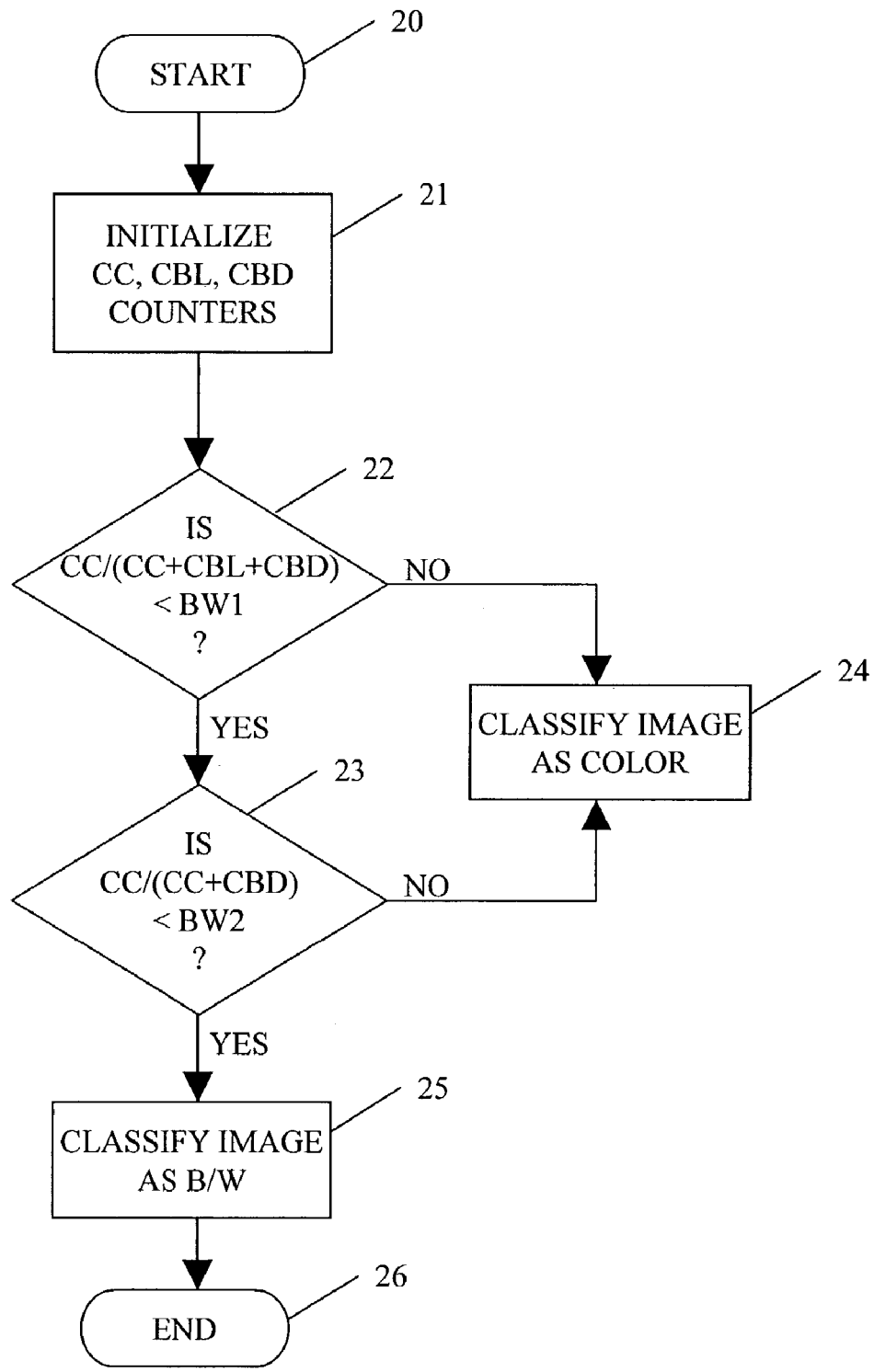
FIG. 2 is a block diagram that illustrates the process of detecting if the image is black or white.

Referring now to FIG. 2, a block diagram illustrating the process of detecting if the image is black or white is shown. The process begins with start bubble 20 followed by a process step (block 21) of initializing the CC, CBL and CBD counters. The CC, CBL and CBD counters are initialized as follows:

Counter CC: Number of samples with |U|+|V|>=thr_UV
Counter CBL: Number of samples with |U|+|V|<thr_UV and |Y|>=thr_Y
Counter CBD: Number of samples with |U|+|V|<thr_UV and |Y|<thr_Y where |U| and |V| represent the magnitude of sample chromaticity, |Y| represents the magnitude of sample luminance, and both thr_UV and thr_Y are adjustable thresholds.

Still referring to FIG. 2, counter CC evaluates the number of samples whose chromaticity is larger than a certain level. Thus, the value of CC represents the number of color pixels. Counter CBL counts the number of samples whose chromaticity is smaller than a certain level and whose luminance is larger than or equal to a certain level. Thus, the value of CBL represents the number of possible black and white pixels that are light. Finally, counter CBD counts the number of samples whose chromaticity is smaller than a certain level but whose luminance is smaller than a certain level. Thus, the value of CBD represents the number of black and white pixels that are dark. Other criterions to effectively estimate the three classes of samples can also be used.

With careful selection of the thresholds thr_UV and thr_Y, CC counts the number of color pixels, CBL counts black and white pixels with higher luminance (possibly light-gray background), and CBD represents black and white pixels that are dark. The total number of samples is equal to the summation of all three counters, or CC+CBL+CBD.

Referring to FIG. 2, the process continues with an inquiry (decision diamond 22) as to whether the ratio of counter CC over the total number of samples (CC+CBL+CBD) is less than BW1, where BW1 is a threshold value for black and white image detection. If the answer to this inquiry is no, process step 24 classifies the image as a color image. If the answer to this inquiry is yes, meaning the percentage of color pixels in the image is smaller than BW1, the image is most likely a black and white one. However, some exceptions exist.

For example, pure color text written on a sheet of white paper should be considered color input even if it occupies only a small fraction of paper area. In addition, if both color and black/gray text (or graphic) exists, and the area of color text/graphic is very small compared to black or gray text/graphic, the image should be classified as black and white. Therefore, if the answer to the inquiry posed by decision diamond 22 is yes, the process continues with another inquiry.

With reference to FIG. 2, decision diamond 23 asks whether the ratio of counter CC over the combination of color pixels and darker pixels (CC+CBD) is less than threshold BW2. Threshold BW2 represents a threshold for black and white image detection. If the answer to this inquiry is yes, the process classifies the input image as black and white (block 25). If the answer to this inquiry is no, the process classifies the image as a color image (block 24). The process then exits (end bubble 26).

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A method for classifying an input image as black and white or color comprising: calculating a first ratio of a color pixel portion to a total pixel portion in the input image; calculating a second ratio of the color pixel portion to a combined pixel portion in the input image, the combined pixel portion comprising the color pixel portion and a dark black and white pixel portion; and returning an indication the input image is black and white if the first ratio is less than a first threshold and the second ratio is less than a second threshold.

2. The method according to claim 1 wherein the input image is in RGB format.

3. The method according to claim 1 wherein the input image is sampled.

4. The method according to claim 3 wherein the input image is averaged to remove color deviation.

5. The method according to claim 1 wherein the input image is converted to a luminance-chromacity-based space.

6. The method according to claim 5 wherein the luminance-chromacity-based space is a YUV color space.

7. The method according to claim 1 wherein the total pixel portion comprises the color pixel portion, the dark black and white pixel portion, and a light black and white pixel portion.

8. An image processing device for classifying an input image as black and white or color comprising: means for calculating a first ratio of a color pixel portion to a total pixel portion in the input image; means for calculating a second ratio of the color pixel portion to a combined pixel portion in the input image, the combined pixel portion comprising the color pixel portion and a dark black and white pixel portion; and means for returning an indication the input image is black and white if the first ratio is less than a first threshold and the second ratio is less than a second threshold.

9. The image processing device according to claim 8 wherein the input image is in RGB format.

10. The image processing device according to claim 8 wherein the input image is sampled.

11. The image processing device according to claim 10 wherein the input image is averaged to remove color deviation.

12. The image processing device according to claim 8 wherein the input image is converted to a luminance-chromacity-based space.

13. The image processing device according to claim 12 wherein the luminance-chromacity-based space is a YUV color space.

14. The image processing device according to claim 8 wherein the total pixel portion comprises the color pixel portion, the dark black and white pixel portion, and a light black and white pixel portion.

* * * * *